United States Patent
Ito et al.

(10) Patent No.: US 10,828,819 B2
(45) Date of Patent: Nov. 10, 2020

(54) ADJUSTING METHOD OF EXTRUSION RATE

(71) Applicant: NGK INSULATORS, LTD., Nagoya (JP)

(72) Inventors: Hiroaki Ito, Nagoya (JP); Kazuhiko Hamatsuka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 828 days.

(21) Appl. No.: 15/386,275

(22) Filed: Dec. 21, 2016

(65) Prior Publication Data

US 2017/0197349 A1 Jul. 13, 2017

(30) Foreign Application Priority Data

Jan. 8, 2016 (JP) .................. 2016-002237

(51) Int. Cl.
  *B28B 3/26* (2006.01)
  *B29C 48/30* (2019.01)
  (Continued)

(52) U.S. Cl.
  CPC .............. *B29C 48/30* (2019.02); *B28B 3/269* (2013.01); *B29C 48/11* (2019.02); *B29C 48/92* (2019.02);
  (Continued)

(58) Field of Classification Search
  None
  See application file for complete search history.

(56) References Cited

U.S. PATENT DOCUMENTS 3,292,211 A * 12/1966 Strange .................. B29C 48/30
                                                425/135
4,550,005 A * 10/1985 Kato ....................... B28B 3/269
                                                264/177.12
(Continued)

FOREIGN PATENT DOCUMENTS

JP        02-044964        11/1990
JP        10-315213        12/1998
(Continued)

OTHER PUBLICATIONS

Extended European Search Report (Application No. 16206396.0) dated Jun. 16, 2017.
(Continued)

*Primary Examiner* — Monica A Huson
*Assistant Examiner* — Kelsey C Grace
(74) *Attorney, Agent, or Firm* — Burr & Brown, PLLC

(57) ABSTRACT

In the adjusting method of the extrusion rate, a perforated plate is superimposed on and attached to a forming die, the perforated plate includes a plurality of through hole portions, the adjusting method includes a perforated plate group consisting of a plurality of perforated plates which are different in degree of diameter decrease of the hole diameter, and the adjusting method includes a trial extrusion step of extruding the forming material to form a trial honeycomb formed body, a shape measuring step of measuring a shape of a formed body end face of the trial honeycomb formed body, and a perforated plate selecting step of selecting the perforated plate to be suitably attached to the forming die.

8 Claims, 7 Drawing Sheets

(51) Int. Cl.
  *B29C 48/11* (2019.01)
  *B29C 48/92* (2019.01)
  *B29C 48/00* (2019.01)
(52) U.S. Cl.
  CPC .... *B29C 48/0022* (2019.02); *B29C 2948/926* (2019.02); *B29C 2948/92114* (2019.02)

(56) References Cited

U.S. PATENT DOCUMENTS

| | | | |
|---|---|---|---|
| 2004/0079469 A1* | 4/2004 | Chan | C04B 35/195 |
| | | | 156/89.11 |
| 2007/0294989 A1 | 12/2007 | Ichikawa | |
| 2011/0049741 A1 | 3/2011 | Brown et al. | |
| 2011/0176718 A1* | 7/2011 | Momonoi | G06T 7/001 |
| | | | 382/145 |

FOREIGN PATENT DOCUMENTS

| | | |
|---|---|---|
| JP | 2003-104776 A1 | 4/2003 |
| WO | 2011/158915 A1 | 12/2011 |

OTHER PUBLICATIONS

Japanese Office Action (Application No. 2016-002237) dated Jul. 24, 2018 (with English translation).

\* cited by examiner

| EX. | DIAMETER DECREASE RATIO/% | HEIGHT (H) | PATTERN SCHEMATIC VIEW |
|---|---|---|---|
| NO PERFORATED PLATE | | 17mm |  |
| EX. 1 | 11.10 | 13mm |  |
| EX. 2 | 21.60 | 9mm |  |
| EX. 3 | 31.30 | 5mm |  |
| EX. 4 | 42.70 | 1mm |  |

<BEFORE CORRECTION>

<AFTER CORRECTION>

ADJUSTING METHOD OF EXTRUSION RATE

"The present application is an application based on JP-2016-002237 filed on Jan. 8, 2016 with Japan Patent Office, the entire contents of which are incorporated herein by reference."

BACKGROUND OF THE INVENTION

Field of the Invention

The present invention relates to an adjusting method of an extrusion rate. More particularly, it relates to an adjusting method of an extrusion rate to achieve a uniformity of an extrusion rate of a forming material in a forming die for extrusion of a honeycomb formed body.

Description of the Related Art

Heretofore, a ceramic honeycomb structure has been used in a broad use application of a car exhaust gas purifying catalyst carrier, a diesel particulate removing filter, a heat reservoir for a combustion device or the like. The ceramic honeycomb structure (hereinafter referred to simply as "the honeycomb structure") is manufactured through steps of mixing and kneading forming raw materials at a predetermined blend ratio to prepare a forming material and extruding the forming material in the form of a honeycomb by use of an extruder and a firing step of firing a honeycomb formed body subjected to crude cutting, drying and finish cutting at a high temperature.

A forming die to form a desirable honeycomb shape is attached to an extrusion port of the extruder. It is generally known that there is the tendency that in a case of extruding the forming material from the forming die, an extrusion rate in a central portion of an end face of the die which is perpendicular to an extruding direction becomes fast, and the extrusion rate in a circumferential portion of the die end face becomes slow. Therefore, the honeycomb formed body extruded from the forming die is easy to become a so-called "central convex shape" in which a center of an end face of the formed body bulges from a circumference.

It is known that a difference in extrusion rate between the central portion of the forming die and the circumferential portion thereof, which is generated during the extrusion, changes due to various factors such as an individual difference of the forming die, a state (a temperature, a hardness, a blend ratio, a kneading degree or the like) of the forming material, and an individual difference of the extruder. The above extrusion rate difference brings about deformation or cut in cell partition walls of an extruded honeycomb structure, and deteriorates characteristics including a mechanical strength and the like of the honeycomb structure finally obtained through the firing step, and in this way, a product quality of the honeycomb structure might noticeably be influenced. To eliminate such a problem, in a forming step of performing the extrusion of the honeycomb formed body, adjustment is performed to prevent the formed body end face from having the central convex shape and to achieve a uniformity of the extrusion rate of the forming material in the center and circumference of the die end face.

For example, a flow resistance per back hole of the forming die to the forming material is adjusted, and an amount of the forming material to be passed is adjusted.

Furthermore, to the surface of the forming die on a back hole side, there is attached a perforated plate including a plurality of through hole portions to obtain the uniformity of the extrusion rate (e.g., see Patent Documents 1 and 2). To correct the central convex shape, the perforated plate is formed by disposing the plurality of through hole portions at positions to face the back holes of the forming die, and a hole diameter of the through hole portion changes to decrease from a circumferential portion of the perforated plate toward a central portion thereof.

As a result, in each through hole portion having a small hole diameter around the central portion, the amount of the forming material to be passed is smaller than that around the circumferential portion even in a case where the same extrusion pressure is applied. As a result, there is inhibited the extrusion rate of the forming material supplied through the through hole portions to the back holes of the forming die. Consequently, it is possible to achieve the uniformity of the extrusion rate in the die end face of the forming die.

[Patent Document 1] JP-Y-H02-44964
[Patent Document 2] JP-A-H10-315213

SUMMARY OF THE INVENTION

However, problems mentioned below might occur in such adjustment of an extrusion rate as described above. That is, in a case of adjusting a flow resistance per back hole of a forming die to a forming material, a part depending on expert experience of an operator might be large, and the adjusting operation of an extruding operation might require much time. Therefore, a manufacturing efficiency of a honeycomb structure might be influenced.

On the other hand, it is necessary to prepare a perforated plate to achieve a uniformity of an extrusion rate for each extrusion die. A perforated plate attaching operation itself does not require much time, but a central convex shape changes due to various factors such as a state of the forming material and an individual difference of an extruder in addition to an individual difference of the extrusion die, and hence an effect of the above correction is not constant. Therefore, it has been difficult to perform an operation of selecting the most suitable perforated plate in accordance with the central convex shape including a degree of diameter decrease of a hole diameter of each through hole portion of the perforated plate. Therefore, there increases an operation of attaching a plurality of types of perforated plates to a forming die, extruding a honeycomb formed body on trial and confirming the central convex shape, and the adjusting operation might require much time in the same manner as described above.

To eliminate such problems, the present invention has been developed in view of the above actual situations, and an object thereof is to provide an adjusting method of an extrusion rate in which a perforated plate is attached to a forming die to achieve a uniformity of an extrusion rate of a forming material, and it is possible to rapidly select the most suitable perforated plate to be attached to the forming die from a perforated plate group consisting of a plurality of perforated plates.

According to the present invention, there is provided an adjusting method of an extrusion rate which solves the above problems.

According to a first aspect of the present invention, an adjusting method of an extrusion rate is provided in which a perforated plate is superimposed on and attached to a forming die for use in extrusion of a honeycomb formed body, to achieve a uniformity of an extrusion rate of a forming material which passes through the forming die at a die surface, the perforated plate comprising a plurality of through hole portions bored at positions of a perforated plate surface which face back holes opened at a die back surface, to introduce the forming material into the forming die, the through hole portions being formed so that a hole diameter of the through hole portion decreases from a circumferential portion of the perforated plate toward a central portion thereof gradually or stepwisely, the adjusting method comprising a perforated plate group preparation step preparing a plurality of perforated plates which are different in degree of diameter decrease of the hole diameter of the through hole portion, the adjusting method further comprising a trial extrusion step of using the forming die to which the perforated plate is not attached, extruding the forming material from the forming die, and forming a trial honeycomb formed body, a shape measuring step of measuring a shape of a formed body end face of the trial honeycomb formed body, and a perforated plate selecting step of selecting one perforated plate to be attached to the forming die from the perforated plate group on the basis of a matching relation between the measured shape of the formed body end face and the degree of the diameter decrease of the hole diameter in the perforated plate.

According to a second aspect of the present invention, the adjusting method of the extrusion rate according to the above first aspect is provided, wherein the shape measuring step is constituted to measure the shape of the formed body end face which is perpendicular to an extruding direction of the forming material to be extruded to form the trial honeycomb formed body, and comprises a contour map preparing step of dividing a height from a circumferential edge of the measured formed body end face to a topmost portion thereof at equal intervals, and preparing a contour map indicating a distribution of the heights of the formed body end face, a contour line dividing step of dividing the formed body end face into a plurality of end face regions on the basis of the prepared contour map, and a hole diameter setting step of allotting the divided end face regions to the perforated plate surface of the perforated plate, and setting the hole diameter of the through hole portion so that the hole diameter decreases from an outermost circumference division of the perforated plate toward a central division thereof in accordance with a predetermined reference.

According to a third aspect of the present invention, the adjusting method of the extrusion rate according to the above second aspect is provided, wherein the perforated plate selecting step is constituted to select the perforated plate from the perforated plate group on the basis of a matching relation between a difference in height from the circumferential edge to the topmost portion of the formed body end face and the degree of the diameter decrease of the hole diameter.

According to a fourth aspect of the present invention, the adjusting method of the extrusion rate according to the above second or third aspects is provided, wherein the contour map preparing step is constituted to divide the height from the circumferential edge of the formed body end face to the topmost portion thereof into at least three stages at equal intervals to prepare the contour map, and the contour line dividing step is constituted to divide the formed body end face into at least three end face regions.

According to a fifth aspect of the present invention, the adjusting method of the extrusion rate according to any one of the above second to fourth aspects is provided, wherein when the degree of the diameter decrease is a diameter decrease ratio represented by Equation (1) mentioned below, a value of the diameter decrease ratio is in a range of 7% to 50%:

$$(X-Y)/X \times 100, \quad \text{Equation (1):}$$

in which X is a hole area of the through hole portion positioned in the outermost circumference division of the perforated plate, and Y is a hole area of the through hole portion positioned in the central division of the perforated plate.

According to a sixth aspect of the present invention, the adjusting method of the extrusion rate according to any one of the above first to fifth aspects is provided, wherein the hole diameter of the through hole portion of the perforated plate is the same as a back hole diameter of the back hole of the forming die or smaller than the back hole diameter.

According to a seventh aspect of the present invention, the adjusting method of the extrusion rate according to any one of the above first to sixth aspects is provided, which further comprises a formed body drying step of drying the trial honeycomb formed body formed by the trial extrusion step, wherein the shape measuring step is constituted to measure the shape of the formed body end face of the trial honeycomb formed body dried in the formed body drying step.

According to an eighth aspect of the present invention, the adjusting method of the extrusion rate according to any one of the above first to seventh aspects is provided, wherein in the perforated plate, the perforated plate surface possesses a circular shape or an elliptic shape.

According to an adjusting method of an extrusion rate of the present invention, a perforated plate including a plurality of through hole portions in which a hole diameter decreases from an outermost circumference division toward a central division is attached to a forming die, thereby making it possible to achieve a uniformity of the extrusion rate of a forming material. As a result, on the basis of a matching relation between a formed body end face of a trial honeycomb formed body and a degree of the diameter decrease of the hole diameter of the through hole portion, one perforated plate suitable for adjustment of the extrusion rate can easily be selected from a perforated plate group.

DESCRIPTION OF THE PREFERRED EMBODIMENTS

Figure 1:
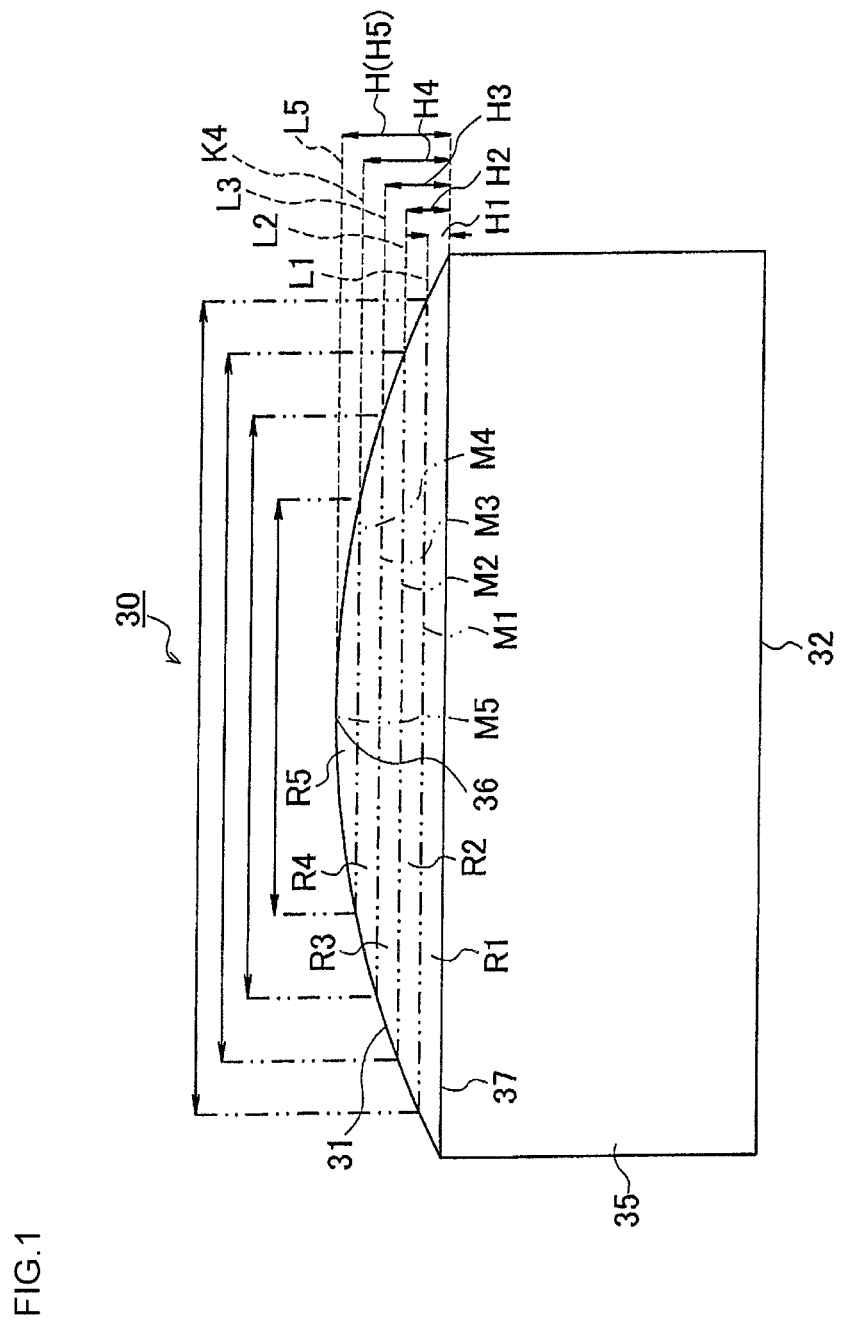
FIG. 1 is a front view schematically showing one example of a trial honeycomb formed body in an adjusting method of an extrusion rate of the present embodiment.
Figure 2:
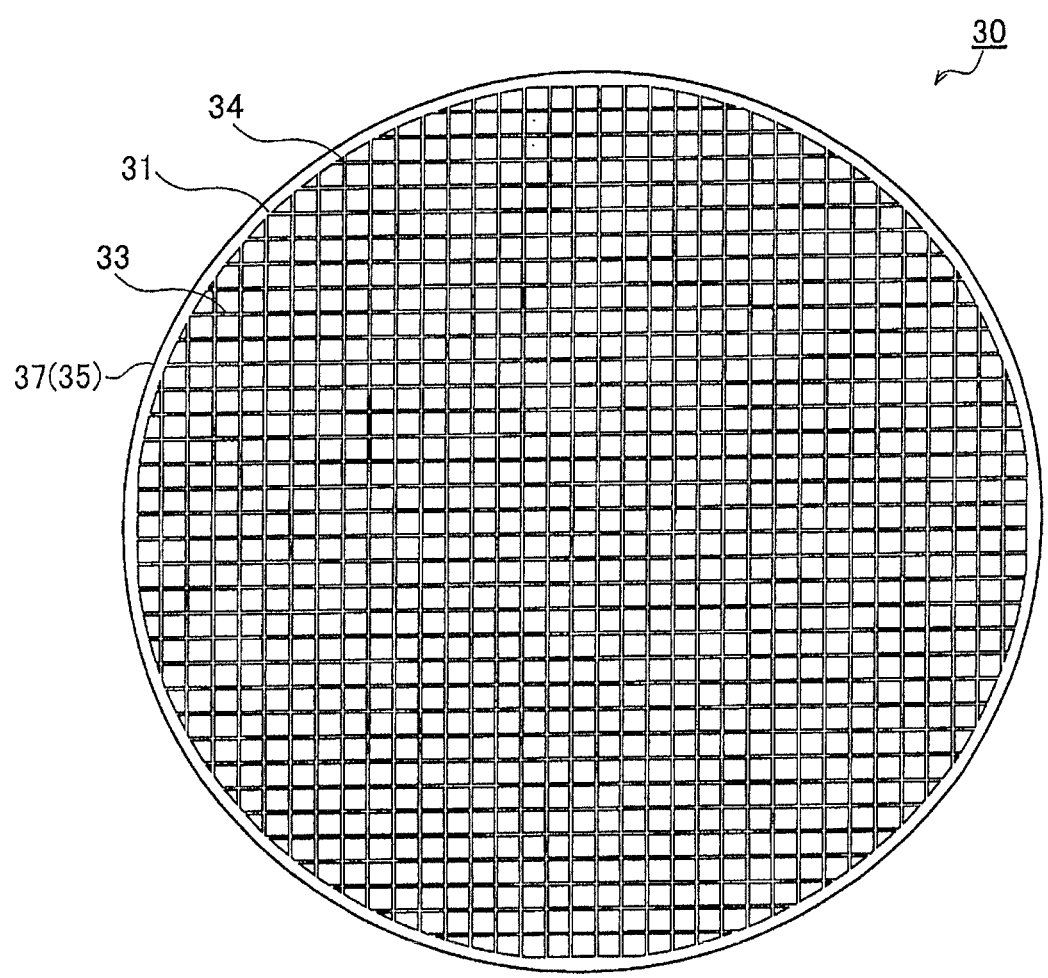
FIG. 2 is a plan view schematically showing one example of a formed body end face of the trial honeycomb formed body of FIG. 1.
Figure 3:
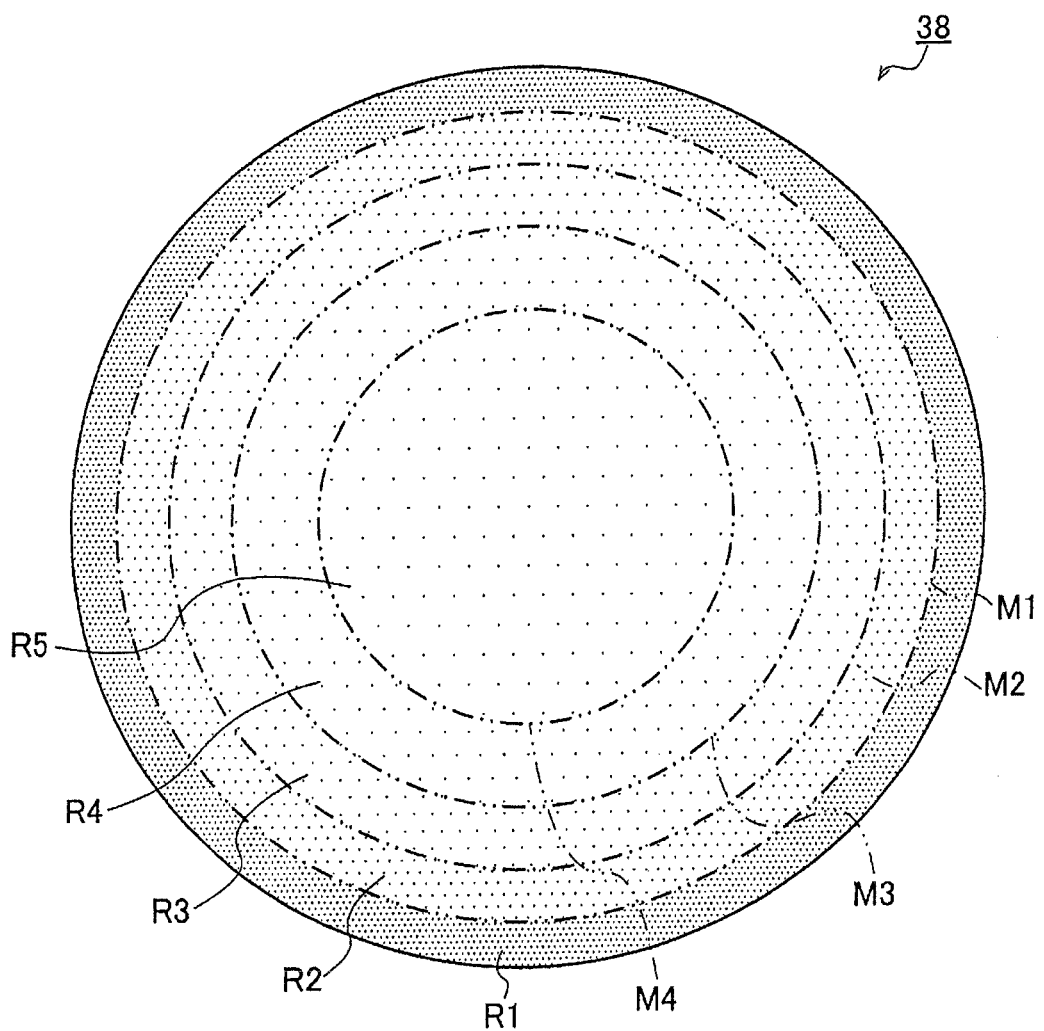
FIG. 3 is a plan view schematically showing one example of a contour map prepared on the formed body end face of the trial honeycomb formed body.
Figure 4:
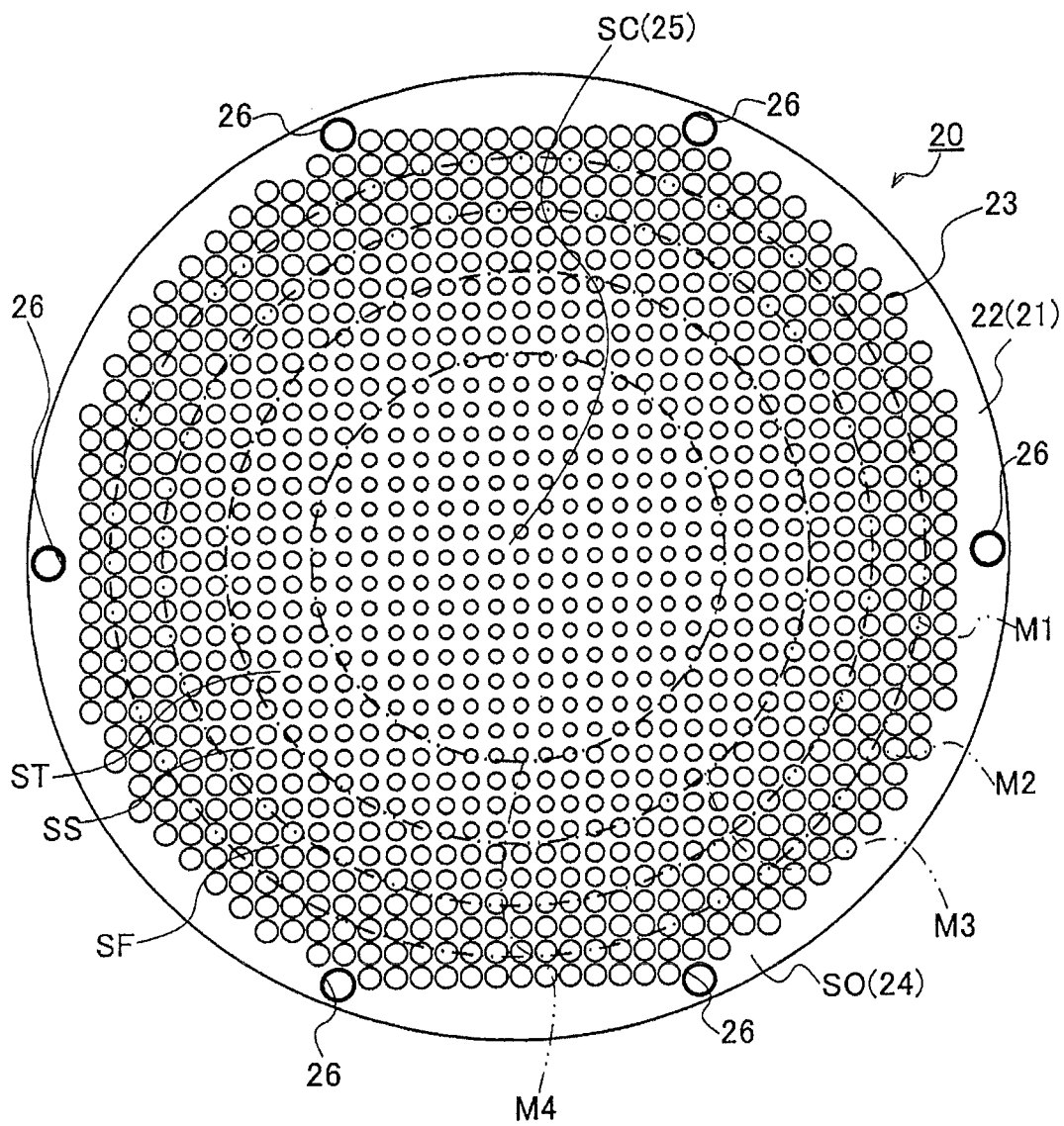
FIG. 4 is a plan view schematically showing one example of a perforated plate to be attached to a forming die.

Hereinafter, an embodiment of an adjusting method of an extrusion rate of the present invention will be described in detail with reference to the drawings. It is to be noted that the adjusting method of the extrusion rate of the present invention is not especially limited to the following embodiment, and various design changes, modifications, improvements and the like can be added without departing from the gist of the present invention.

In an adjusting method of an extrusion rate of the present embodiment (hereinafter referred to simply as "the adjusting method"), as mainly shown in FIG. 1 to FIG. 6, a perforated plate 20 is superimposed on and attached to a forming die 10, to achieve a uniformity of an extrusion rate of a forming material which passes through the forming die 10 to be extruded from a die surface 11 of a slit portion 14. Furthermore, from a perforated plate group consisting of a plurality of beforehand prepared perforated plates 20 which are different in degree of diameter decrease (a diameter decrease ratio) (details will be described later), there is constructed a matching relation between the degree of the diameter decrease of a hole diameter D of a through hole portion 23 and a shape of a formed body end face 31 of a trial honeycomb formed body 30, thereby making it easy to select the perforated plate 20 for use during production in large quantities.

(1) Perforated Plate

Figure 5:
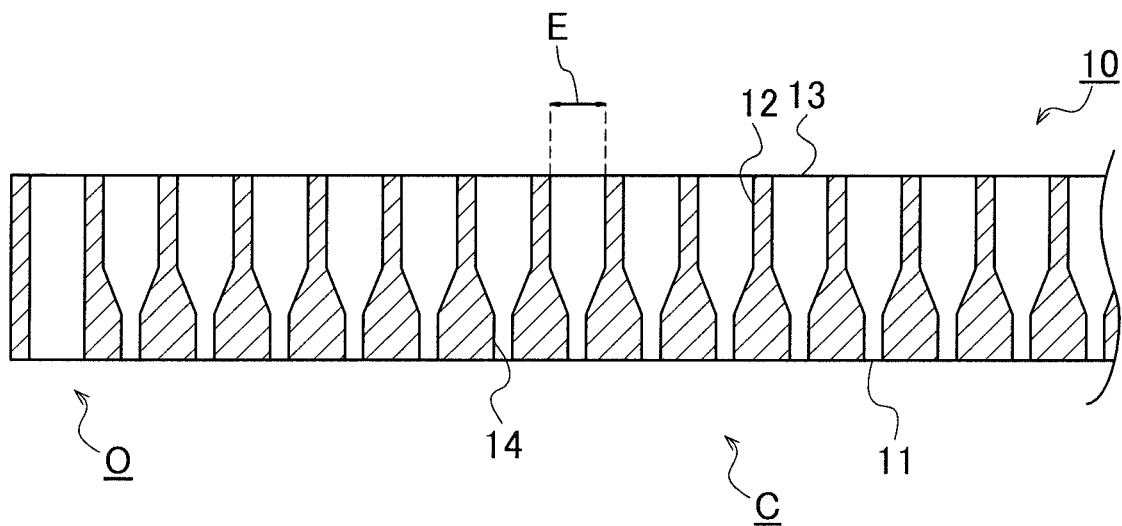
FIG. 5 is a partially enlarged front cross-sectional view schematically showing one example of the forming die.
Figure 6:
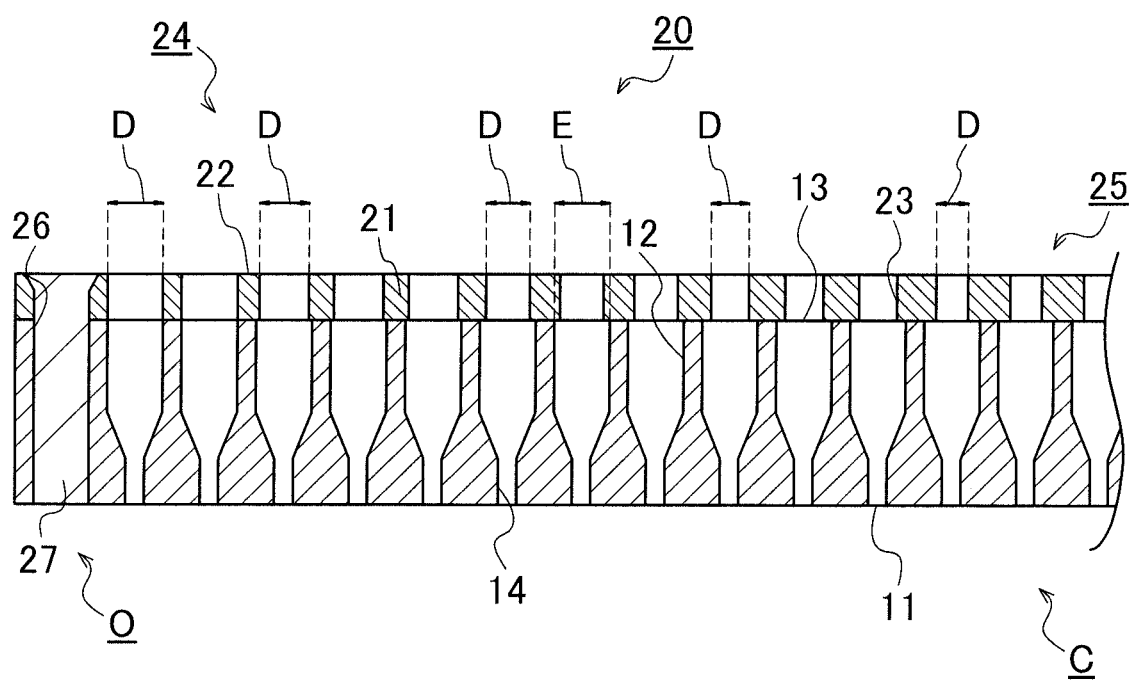
FIG. 6 is a partially enlarged front cross-sectional view schematically showing one example of a state of attaching the perforated plate to the forming die.

The perforated plate 20 for use in the adjusting method of the present embodiment includes a perforated plate main body 21 possessing a thin circular plate shape, and a plurality of round hole-shaped through hole portions 23 extending between respective perforated plate surfaces 22 on a front side and a back side of the perforated plate main body 21 and bored at a predetermined arrangement interval. Here, the plurality of bored through hole portions 23 are disposed to face a die back surface 13 of the forming die 10 to which the perforated plate 20 is attached and to correspond to positions of a plurality of back holes 12 opened in the die back surface 13. The back holes 12 of the forming die 10 are formed to introduce the forming material into the forming die 10. It is to be noted that FIG. 5 and FIG. 6 show schematic constitutions of the forming die 10 and the perforated plate 20, respectively. There differ an actual ratio of a thickness between the perforated plate 20 and the forming die 10 and a ratio of a hole diameter between the through hole portion 23 and the back hole 12.

Furthermore, the through hole portions 23 of the perforated plate 20 for use in the adjusting method of the present embodiment are formed so that the hole diameter D of the through hole portion 23 decreases from a circumferential portion 24 of the perforated plate 20 toward a central portion 25 thereof stepwisely. Here, in the case of the adjusting method of the present embodiment, five types of through hole portions 23 different in hole diameter D are formed, and the diameter decreases from the circumferential portion 24 toward the central portion 25 in five stages (see FIG. 4). Here, there is not any special restriction on the degree of the diameter decrease of each through hole portion 23 (the diameter decrease ratio), and it is illustrated that the hole diameter D of the through hole portion 23 in the vicinity of the circumferential portion 24 is defined as a reference, and the hole diameter D decreases as much as predetermined several mm, or a decrease ratio of a hole area of the through hole portion 23 which is calculated on the basis of the hole diameter D constantly changes.

Furthermore, the hole diameter D of the through hole portion 23 is set to be the same as a back hole diameter E of the back hole 12 of the forming die 10 or smaller than the back hole diameter E. That is, any through hole portion 23 bored in the perforated plate 20 satisfies a relation of "the hole diameter D the back hole diameter E". Particularly, the hole diameter D of the through hole portion 23 in the vicinity of the circumferential portion 24 may match the back hole diameter E. The hole diameter D of the through hole portion 23 decreases from the circumferential portion 24 toward the central portion 25, thereby limiting an amount of the forming material to be sent out to the forming die 10 via the perforated plate 20. As a result, in the forming die 10, an extrusion rate in the vicinity of a center C is lower than that in the vicinity of a circumference O. Therefore, it is possible to prevent the formed body end face 31 from becoming a central convex shape and to achieve a uniformity of the extrusion rate.

There is not any special restriction on a material of the perforated plate 20, but a metal material such as stainless steel having a plate thickness of about several mm, tool steel or cemented carbide is mainly used, and a plurality of through hole portions 23 extending through the perforated plate surface 22 are formed by using a well-known metal processing technology such as drilling. Furthermore, it is preferable that the perforated plate 20 is coated with a material excellent in wear resistance. It is to be noted that as the forming die 10 to which the perforated plate 20 is attached, a well-known forming die for use in extrusion of a conventional honeycomb formed body is used, and detailed description thereof is omitted here.

In the adjusting method of the present embodiment, there has been described an example of the perforated plate 20 including the round hole-shaped through hole portions 23 in the perforated plate main body 21 having a thin circular plate shape, but the present invention is not limited to this example, and a perforated plate having an optional shape is usable in accordance with the shape of the honeycomb formed body of a forming target or a shape of the forming die to which the perforated plate is to be attached. For example, the perforated plate may include a perforated plate main body possessing an elliptic shape or a quadrangular shape, and square hole-shaped through hole portions. Furthermore, the diameter decrease of the hole diameter D of the through hole portion 23 is not limited to the above-mentioned five stages, but the diameter may decrease in at least three stages. Furthermore, the hole diameter D does not have to decrease from the circumferential portion 24 of the perforated plate 20 toward the central portion 25 thereof gradually or stepwisely, but the hole diameter D may gradually change toward the central portion 25.

(2) Degree of Diameter Decrease (Diameter Decrease Ratio)

In the adjusting method of the present embodiment, one perforated plate 20 which is suitably attached to the forming die 10 and in which the extrusion rate is adjustable is selected on the basis of a matching relation between the degree of the diameter decrease (the diameter decrease ratio) of the through hole portion 23 of the perforated plate 20 and the shape of the formed body end face 31 of the extruded trial honeycomb formed body 30. Here, in a case of defining a hole area X of the through hole portion 23 of an outermost circumference division SO including the circumferential portion 24 of the perforated plate 20 and a hole area Y of the through hole portion 23 in a central division SC including the central portion 25, the degree of the diameter decrease is represented by the hole area X and the hole area Y in Equation (1) mentioned below.

$$(X-Y)/X \times 100 (\%) \qquad \text{Equation (1)}$$

That is, the hole area X calculated from the hole diameter D of the through hole portion 23 of the outermost circumference division SO is defined as a reference, and a difference (X−Y) between the hole area X and the hole area Y calculated from the hole diameter D of the through hole portion 23 of the central division is divided by the hole area X and indicated in percentage. Consequently, the degree of the performed diameter decrease can be grasped to the hole area X of the reference. Here, the hole area X or the hole area Y is obtainable from the hole diameter D by multiplying a square of ½ of each hole diameter D by a ratio π of a circumference of a circle to its diameter.

For the degree of the diameter decrease of the through hole portion 23, the hole area Y of the through hole portion 23 in the central division SC is set to a range of 7 to 50% and further preferably 10 to 45% to the hole area X of the through hole portion 23 in the outermost circumference division SO. In a case where the degree of the diameter decrease is lower than 7%, a large difference is not generated in extrusion rate of the forming material in the vicinity of the center C and the vicinity of the circumference O of the die surface 11, and a sufficient adjustment effect of the extrusion rate cannot be obtained. On the other hand, in a case where the diameter decrease ratio is in excess of 50%, the adjustment effect of the extrusion rate excessively increases, the extrusion rate in the vicinity of the circumference O is faster than that in the vicinity of the center C of the die surface 11, and a honeycomb formed body of "the central convex shape" is easy to be formed. Therefore, the diameter decrease ratio is suppressed in the above range.

Hereinafter, there will be described details of a setting method of the hole diameter D of the perforated plate 20 according to the adjusting method of the present embodiment and a specific example of the adjusting method of the extrusion rate of the forming material based on the perforated plate 20.

(3) Extrusion of Trial Honeycomb Formed Body

First, the trial honeycomb formed body 30 is extruded by using the forming die 10 to which the perforated plate 20 is not attached (a non-attached state) (a trial extrusion step). Specifically, the forming die 10 is set in an extrusion port of a well-known extruder (not shown), and then the forming material having a viscosity or the like beforehand adjusted is thrown into the extruder. Consequently, the forming material is introduced from the back holes 12 into the forming die 10, and is finally extruded from the die surface 11, thereby forming the trial honeycomb formed body 30 (see FIG. 1, FIG. 2 and the like).

At this time, after preliminary extruding a part of the forming material from the forming die 10 and confirming that the forming material is extruded from the whole die surface 11, the extrusion of the forming material is stopped once and the forming material extruded out from the die surface 11 is removed. Afterward, the extrusion of the forming material starts again, and the extrusion continues until the trial honeycomb formed body 30 has a stipulated length. The trial honeycomb formed body reaching the stipulated length is cut along a plane (the plane parallel to the die surface 11) which is perpendicular to the extruding direction (corresponding to an upper direction from a paper surface lower direction in FIG. 1). The trial honeycomb formed body 30 is disposed so that an obtained cut face 32 becomes a lower surface, and drying is performed on predetermined drying conditions (a formed body drying step).

In consequence, the trial honeycomb formed body 30 can be obtained. Here, the obtained trial honeycomb formed body 30 includes lattice-like partition walls 34 defining a plurality of cells 33 extending from one end face (the formed body end face 31) to the other end face (the cut face 32) and forming through channels for a fluid, and a circumferential wall 35 of a circumferential portion of the trial honeycomb formed body 30 which is disposed around the partition walls 34.

Here, the trial honeycomb formed body 30 is extruded by the above technique in a state where the perforated plate 20 is not attached, and hence the extrusion rate is not adjusted. Therefore, as described above, there is usually the tendency that the extrusion rate in the vicinity of the center C of the die surface 11 of the forming die 10 becomes fast, whereas the extrusion rate in the vicinity of the circumference O of the die surface 11 becomes slow. Therefore, the trial honeycomb formed body 30 extruded in the state where the perforated plate 20 is not attached is easy to have "the central convex shape" in which an end face center 36 of the formed body end face 31 bulges in a convex manner from a circumferential edge 37 of the formed body end face 31 (see FIG. 1).

As the adjusting method of the present embodiment, there is illustrated an adjusting method of performing a drying treatment after the extrusion and adjusting the extrusion rate on the basis of the shape of the formed body end face 31 of the dried trial honeycomb formed body 30 as described above. Consequently, it becomes easy to measure a difference (a height H) from the circumferential edge 37 to a topmost portion (the end face center 36).

It is to be noted that the adjusting method of the present invention is not limited to this embodiment, and the shape of the formed body end face 31 of the trial honeycomb formed body 30 prior to the drying treatment just after the extrusion may be measured. That is, in a case of measuring the shape of the formed body end face 31 in the middle of a manufacturing process of a honeycomb structure, the shape is measured regarding the trial honeycomb formed body 30 before dried, so that it is possible to rapidly adjust the extrusion rate without delaying the manufacturing process. In a case of measuring the shape of the formed body end face 31 in a non-contact manner, the measurement prior to the drying treatment is possible.

(4) Measurement of Shape of Formed Body End Face

The shape of the formed body end face 31 of the trial honeycomb formed body 30 after the drying treatment is measured (a shape measuring step). Specifically, there is measured the height H (see FIG. 1) that is the difference from the circumferential edge 37 of the formed body end face 31 to the most bulging position (the topmost portion) of the end face center 36. Here, the height H is measured by, for example, using a well-known scale, attaching the scale to a measuring position of the trial honeycomb formed body 30, and reading graduations of the scale by a measurement operator.

(5) Preparation of Contour Map and Division of End Face Region

Next, the measured height H is divided so that respective heights are equal. Here, it is illustrated that the height H is divided into five equal heights at equal intervals (see FIG. 1). Further, a contour map 38 of the formed body end face 31 is prepared in accordance with a distribution of the respective five divided heights (a contour map preparing step, see FIG. 3).

Specifically, virtual lines L1, L2, L3, L4 and L5 extend from upper ends of respective divided heights H1, H2, H3, H4 and H5 (=H) in a horizontal direction and portions of the lines which come in contact with the formed body end face 31 are defined as contour lines M1, M2, M3, M4 and M5. Consequently, the formed body end face 31 is divided into a plurality of end face regions R1, R2, R3, R4 and R5 by the contour lines M1 and the like which are adjacent to one another (a contour line dividing step, see FIG. 1 and FIG. 3). It is to be noted that the dividing of the height H at equal intervals is not limited to the above five equal heights, and the height may be divided into at least three stages to prepare the contour map 38.

(6) Setting of Hole Diameter

Next, the end face region R1 and the like divided to the formed body end face 31 are allotted to be superimposed on the perforated plate surface 22 of the perforated plate 20. In the present embodiment, for the purpose of corresponding to the five divided end face regions R1 and the like, the outermost circumference division SO, a first intermediate division SF, a second intermediate division SS, a third intermediate division ST and the central division SC are allotted to the perforated plate surface 22 from the circumferential portion 24 of the perforated plate 20 toward the central portion 25 thereof. The allotting to the perforated plate surface 22 of the perforated plate 20 is completed, and then the hole diameter D of the through hole portion 23 to be bored in each division is set (a hole diameter setting step).

(7) Selection of Matching Perforated Plate

A plurality of (e.g., four) perforated plates 20 different in diameter decrease ratio constitute the perforated plate group, each perforated plate 20 is attached to the forming die 10, and then each trial honeycomb formed body 30 is extruded. The perforated plate 20 is attached and fixed with screws by inserting fixing screws 27 into screw holes 26 opened in the circumferential portion 24 of the perforated plate 20 to superimpose the perforated plate on the forming die 10. The forming die 10 to which the perforated plate 20 is attached is attached to the extrusion pot of the extruder. The shape of the formed body end face 31 of the obtained trial honeycomb formed body 30 is measured, and the perforated plate 20 in which the height H from the circumferential edge 37 to the topmost portion (the end face center 36) is minimum is selected as the matching perforated plate 20 (a perforated plate selecting step).

The selected perforated plate 20 is attached to the extruder in the same manner as described above, and honeycomb formed bodies are produced in large quantities by the extrusion.

(8) Selection of Perforated Plate during Production in large Quantities

In a case of starting the production of the honeycomb formed bodies in large quantities, the trial honeycomb formed body 30 is first extruded from the forming die 10 to which the perforated plate 20 is not attached, and the shape of the formed body end face 31 of the trial honeycomb formed body 30 is measured as in the above (4). That is, the height H from the circumferential edge 37 to the end face center 36 (the topmost portion) is measured. The matching relation is estimated from the result of the above (7) and the perforated plate 20 suitable for the adjustment of the extrusion rate is selected from the perforated plate group consisting of the plurality of perforated plates 20 which are different in a value of the height H obtained by the measurement and the degree of the diameter decrease.

As described above, according to the adjusting method of the present embodiment, the shape of the formed body end face 31 of the trial honeycomb formed body 30 extruded on trial is measured, so that it is possible to confirm a degree of deviation of the extrusion rate in the vicinity of the center C and the vicinity of the circumference O of the die surface 11 of the forming die 10. Consequently, it is possible to easily select the perforated plate 20 which is suitable for elimination of the deviation of the extrusion rate from the perforated plate group. In a case of occurrence of a situation where the deviation of the extrusion rate cannot completely be eliminated in a range of the perforated plate group, the perforated plate estimated to be most suitable is additionally prepared, and the perforated plate during the production in large quantities is selected by the above procedure of (8).

That is, it is possible to select the most suitable perforated plate 20 in accordance with the matching relation between the shape of the formed body end face 31 and the degree of the diameter decrease of the hole diameter D of the perforated plate 20, and in a forming step of manufacturing the honeycomb structure, it is possible to correct the shape of the formed body end face 31 in short time. Consequently, it is possible to improve a manufacturing efficiency of the honeycomb structure and it is also possible to acquire stability of a product quality of the honeycomb structure of a final product.

Hereinafter, examples of the adjusting method of the present invention will be described, but the adjusting method of the present invention is not especially limited to these examples.

EXAMPLES

<Extrusion of Trial Honeycomb Formed Body, Measurement of Shape of Formed Body End Face, and Preparation of Contour Map>

A forming die to which a perforated plate is not attached is attached to an extrusion port of an extruder, and a forming material is extruded on predetermined extrusion conditions, thereby forming a trial honeycomb formed body to measure a height from a circumferential edge of a formed body end face to a topmost portion thereof. These details have already been described, and hence detailed description is omitted. Additionally, as the forming die, there was used a forming die by which in a fired honeycomb structure, a partition wall thickness was 0.10 mm and a cell pitch was 1.27 mm. A diameter of the fired honeycomb structure was 132 mm.

In the present example, a height from a circumferential edge to a topmost portion was 17 mm. Such a height (17 mm) is divided into five equal heights, and a contour map is prepared at positions of an equal interval of 3.4 mm from the circumferential edge (see FIG. 1 and FIG. 3). Respective end face regions R1 and the like of a formed body end face divided in accordance with the contour map are projected on a perforated plate surface of a corresponding perforated plate, and the perforated plate surface is divided into five divisions. Here, the respective divisions of an outermost circumference division SO, a first intermediate division SF, a second intermediate division SS, a third intermediate division ST and a central division SC are allotted from a circumferential portion of the perforated plate toward a central portion thereof.

Preparation of Perforated Plate and Setting of Hole Diameter (Examples 1 to 4)

As described above, in a perforated plate surface to which respective divisions were allotted, a plurality of through hole portions extending through the perforated plate surface were bored, and a perforated plate was prepared. In the present embodiment, four types of perforated plates different in diameter decrease ratio of a central division SC to an outermost circumference division SO were prepared (see Table 1 mentioned below).

Here, a hole diameter of the outermost circumference division SO was set to be the same as a back hole diameter of a back hole of a forming die to which the perforated plate was to be attached. The perforated plate of Example 1 was prepared so that a diameter decrease ratio of a hole area of a through hole portion of a central division SC to a hole area of a through hole portion of an outermost circumference division SO was 11.1%. For hole diameters of a first intermediate division SF, a second intermediate division SS and a third intermediate division ST between the outermost circumference division SO and the central division SC, a difference between the hole diameter of the outermost circumference division SO and the hole diameter of the central division SC was divided into equal diameters, and the respective hole diameters were set to successively decrease. Additionally, a boring position of each through hole portion corresponded to a position of each back hole of the corresponding forming die. Similarly, the hole diameter of the through hole portion of each division was set, the perforated plates were prepared in which the diameter decrease ratios were 21.60% (Example 2), 31.30% (Example 3) and 42.70% (Example 4), respectively, and a perforated plate group was formed.

of diameter decrease of the hole diameter (the diameter decrease ratio). Specifically, in a case of starting the production in large quantities, the trial honeycomb formed body is first extruded in a state where the perforated plate is not attached. The height from the circumferential edge of the formed body end face to the topmost portion thereof measured at this time was 18 mm (see an upper part of FIG. 8). According to the previously constructed matching relation, in the perforated plate (the diameter decrease ratio=31.30%) of Example 3, the height of the formed body end face can be adjusted from 17 mm into 5 mm. That is, a decrease value of the height is 12 mm. Therefore, for the purpose of correcting the height of 18 mm, the diameter decrease ratio is estimated to be 18 mm×0.313/12 mm=0.470 by proportional conversion. That is, it is considered that use of the perforated plate having a diameter decrease ratio of 47.00% is most suitable. Therefore, the perforated plate of Example 4 in which the diameter decrease ratio was approximate to 47.00% (the diameter decrease ratio=42.70% and a relative hole diameter=−0.32 mm) was selected from the prepared perforated plate group.

The selected perforated plate was attached to the forming die and a trial honeycomb formed body was extruded. A

TABLE 1

|  | | Central division | Third intermediate division | Second intermediate division | First intermediate division | Outermost circumference division |
|---|---|---|---|---|---|---|
| Example 1 | Diameter decrease ratio/% | 11.10 | 8.40 | 5.60 | 2.80 | — |
| Example 2 | Diameter decrease ratio/% | 21.60 | 16.40 | 11.10 | 5.60 | — |
| Example 3 | Diameter decrease ratio/% | 31.30 | 24.10 | 16.40 | 8.40 | — |
| Example 4 | Diameter decrease ratio/% | 42.70 | 31.30 | 21.60 | 11.10 | — |

*Calculate on the basis of a hole area X of the outermost circumference division <Selection of Matching Perforated Plate and Construction of Matching Relation>

Figure 7:
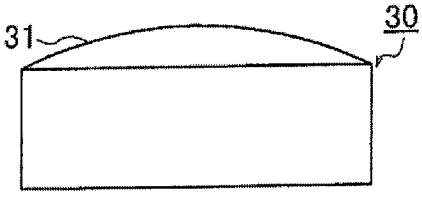
FIG. 7 is an explanatory view showing a height of the formed body end face of the trial honeycomb formed body and a pattern schematic view of a shape of the formed body end face in accordance with the perforated plates which are different in diameter decrease ratio.
Figure 7:
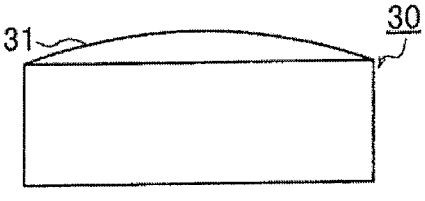
Figure 7:
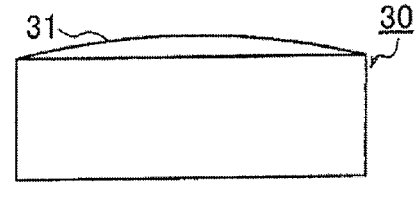
Figure 7:
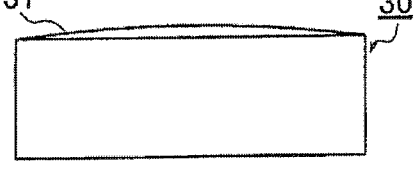
Figure 7:
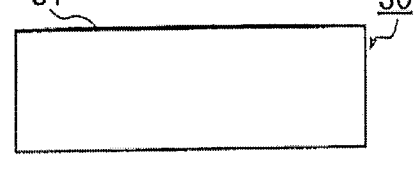

Four types of perforated plates prepared as described above were successively attached to the forming die, and a trial honeycomb formed body was extruded by using each perforated plate. A shape of a formed body end face of the obtained trial honeycomb formed body was measured, and the perforated plate in which a height from a circumferential edge to a topmost portion was minimum was selected as the matching perforated plate. In the present embodiment, the perforated plate of Example 3 which has a diameter decrease ratio of 31.30% is selected (see FIG. 7). Consequently, the height from the circumferential edge to the topmost portion can be 5 mm from (17 mm) when the perforated plate is not attached. In the perforated plate of Example 4, the height is 1 mm and minimum, but there is the possibility that "a central convex shape" occurs due to variations of forming conditions during the extrusion. There is the high possibility that "the central convex shape" brings about the deformation to cell partition walls in the vicinity of a circumference of a honeycomb structure, and hence the perforated plate of Example 4 is not selected. Consequently, a matching relation is constructed.

<Estimation during Production in large Quantities>

Figure 8:
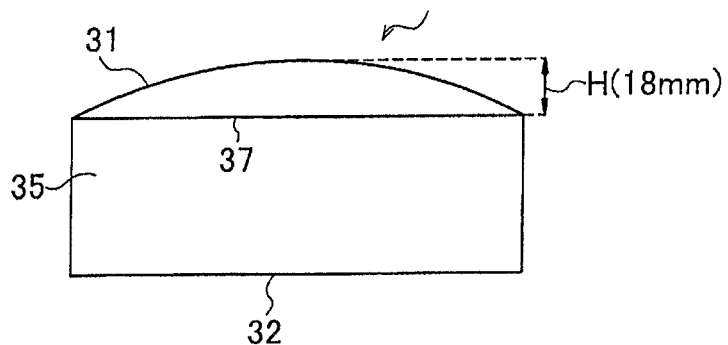
FIG. 8 is an explanatory view showing one example of correction of the formed body end face by the attaching of the perforated plate.
Figure 8:
Figure 8:
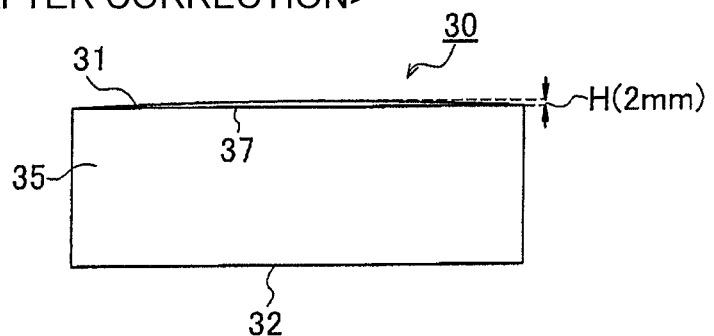

It is possible to correct the shape of the formed body end face by a plurality of perforated plates during production in large quantities on the basis of the matching relation between the shape of the formed body end face and a degree height from a circumferential edge to a topmost portion in a formed body end face of the obtained trial honeycomb formed body was 2 mm (see a lower part of FIG. 8). That is, a decrease value of the height is 16 mm, and by use of the perforated plate of Example 4, it is possible to confirm an effect of a uniformity of an extrusion rate of a forming material at a die surface.

Additionally, it has been confirmed that in a case of applying the above proportional conversion equation to the diameter decrease ratio of 42.70% in the perforated plate of Example 4, a value of 12 mm/0.313/0.427=16.4 mm is obtained and substantially matches an actual correction amount (the decrease value). It is to be noted that the above constructed matching relation is suitably correctable for use in accordance with a honeycomb diameter of the honeycomb formed body to be extruded, a cell density of the honeycomb formed body, or the like.

In the above example, there was used the forming die by which in a fired honeycomb structure, a partition wall thickness was 0.10 mm, a cell pitch was 1.27 mm and a diameter was 132 mm, but a similar result was obtained also in a case of using a forming die by which with the same partition wall thickness and cell pitch, the diameter was 144 mm. Furthermore, a similar result was obtained also in a case of using a forming die by which in a fired honeycomb structure, a partition wall thickness was 0.075 mm, a cell pitch was 1.037 mm, and a diameter was 100 mm or 110 mm.

An adjusting method of an extrusion rate of the present invention is suitably utilizable especially in an extrusion step of extruding a forming material and forming a honeycomb formed body.

DESCRIPTION OF REFERENCE NUMERALS

10: forming die, 11: die surface, 12: back hole, 13: die back surface, 14: slit portion, 20: perforated plate, 21: perforated plate main body, 22: perforated plate surface, 23: through hole portion, 24: circumferential portion, 25: central portion, 26: screw hole, 27: fixing screw, 30: trial honeycomb formed body, 31: formed body end face, 32: cut face, 33: cell, 34: partition wall, 35: circumferential wall, 36: end face center, 37: circumferential edge, 38: contour map, C: vicinity of center, D: hole diameter, E: back hole diameter, H, H1. H2, H3, H4 and H5: height, L1, L2, L3, L4 and L5: virtual line, M1, M2, M3, M4 and M5: contour line, O: vicinity of circumference, R1, R2, R3, R4 and R5: end face region, SC: central division, SF: first intermediate division, SS: second intermediate division, ST: third intermediate division, and SO: outermost circumference division.

What is claimed is:

1. An adjusting method of an extrusion rate in which a perforated plate is superimposed on and attached to a forming die for use in extrusion of a honeycomb formed body, to achieve a uniformity of an extrusion rate of a forming material which passes through the forming die at a die surface,
   the perforated plate comprising a plurality of through hole portions bored at positions of a perforated plate surface which face back holes opened at a die back surface, to introduce the forming material into the forming die,
   the through hole portions being formed so that a hole diameter of the through hole portion decreases from a circumferential portion of the perforated plate toward a central portion thereof gradually or stepwisely,
   the adjusting method comprising:
   a perforated plate group preparation step of preparing a plurality of perforated plates which are different in degree of diameter decrease of the hole diameter of the through hole portion,
   the adjusting method further comprising:
   a trial extrusion step of using the forming die to which the perforated plate is not attached, extruding the forming material from the forming die, and forming a trial honeycomb formed body;
   a shape measuring step of measuring a shape of a formed body end face of the trial honeycomb formed body; and
   a perforated plate selecting step of selecting one perforated plate to be attached to the forming die from the perforated plate group on the basis of a matching relation between the measured shape of the formed body end face and the degree of the diameter decrease of the hole diameter in the perforated plate.

2. The adjusting method of the extrusion rate according to claim 1,
   wherein the shape measuring step is constituted to measure the shape of the formed body end face which is perpendicular to an extruding direction of the forming material to be extruded to form the trial honeycomb formed body, and comprises:
   a contour map preparing step of dividing a height from a circumferential edge of the measured formed body end face to a topmost portion thereof at equal intervals, and preparing a contour map indicating a distribution of the heights of the formed body end face;
   a contour line dividing step of dividing the formed body end face into a plurality of end face regions on the basis of the prepared contour map; and
   a hole diameter setting step of allotting the divided end face regions to the perforated plate surface of the perforated plate, and setting the hole diameter of the through hole portion so that the hole diameter decreases from an outermost circumference division of the perforated plate toward a central division thereof in accordance with a predetermined reference.

3. The adjusting method of the extrusion rate according to claim 2,
   wherein the perforated plate selecting step is constituted to select the perforated plate from the perforated plate group on the basis of a matching relation between a difference in height from the circumferential edge to the topmost portion of the formed body end face and the degree of the diameter decrease of the hole diameter.

4. The adjusting method of the extrusion rate according to claim 2,
   wherein the contour map preparing step is constituted to divide the height from the circumferential edge of the formed body end face to the topmost portion thereof into at least three stages at equal intervals to prepare the contour map, and
   the contour line dividing step is constituted to divide the formed body end face into at least three end face regions.

5. The adjusting method of the extrusion rate according to claim 2,
   wherein when the degree of the diameter decrease is a diameter decrease ratio represented by Equation (1) mentioned below, a value of the diameter decrease ratio is in a range of 7% to 50%:

$$(X-Y)/X \times 100, \qquad \text{Equation (1):}$$

in which X is a hole area of the through hole portion positioned in the outermost circumference division of the perforated plate, and Y is a hole area of the through hole portion positioned in the central division of the perforated plate.

6. The adjusting method of the extrusion rate according to claim 1,
   wherein the hole diameter of the through hole portion of the perforated plate is the same as a back hole diameter of the back hole of the forming die or smaller than the back hole diameter.

7. The adjusting method of the extrusion rate according to claim 1, which further comprises:
   a formed body drying step of drying the trial honeycomb formed body formed by the trial extrusion step,
   wherein the shape measuring step is constituted to measure the shape of the formed body end face of the trial honeycomb formed body dried in the formed body drying step.

8. The adjusting method of the extrusion rate according to claim 1,
   wherein in the perforated plate, the perforated plate surface possesses a circular shape or an elliptic shape.

* * * * *